July 16, 1940.  J. A. TRAYLOR  2,208,141
CONCENTRATING TABLE
Filed Aug. 8, 1938  2 Sheets-Sheet 1
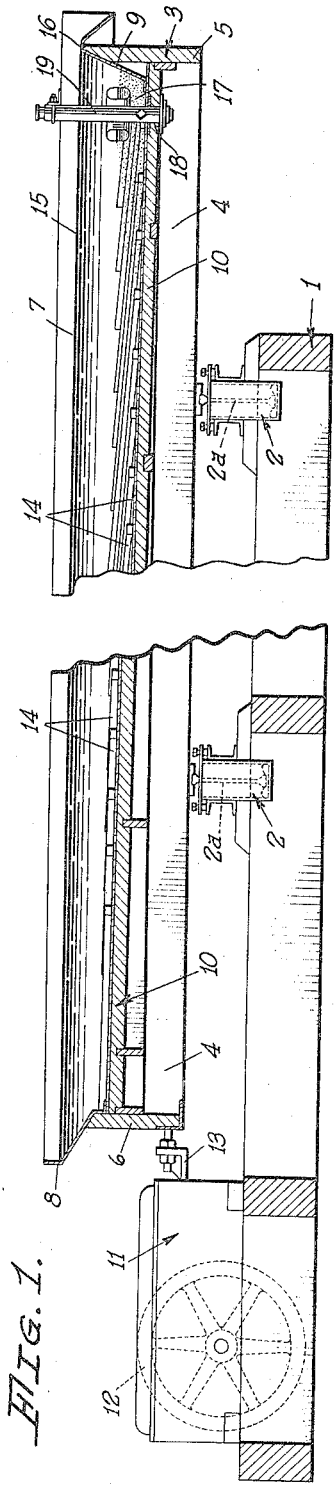
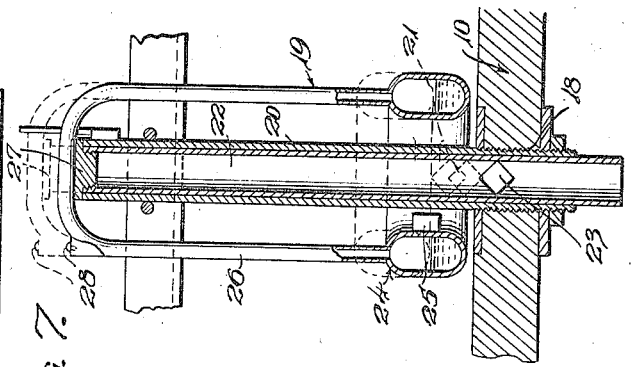
INVENTOR.
JOHN A. TRAYLOR
BY Harold W. Mattingly
ATTORNEY.

July 16, 1940.　　　J. A. TRAYLOR　　　2,208,141
CONCENTRATING TABLE
Filed Aug. 8, 1938　　　2 Sheets—Sheet 2
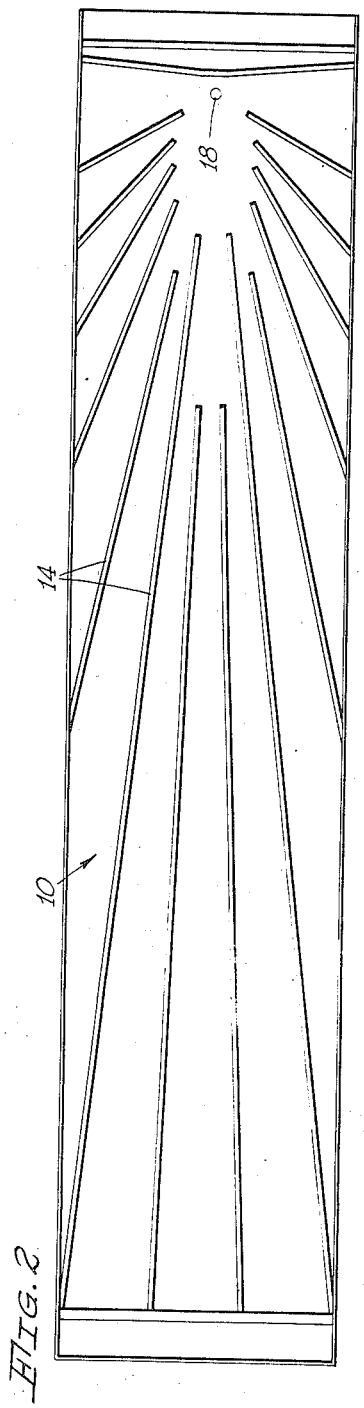
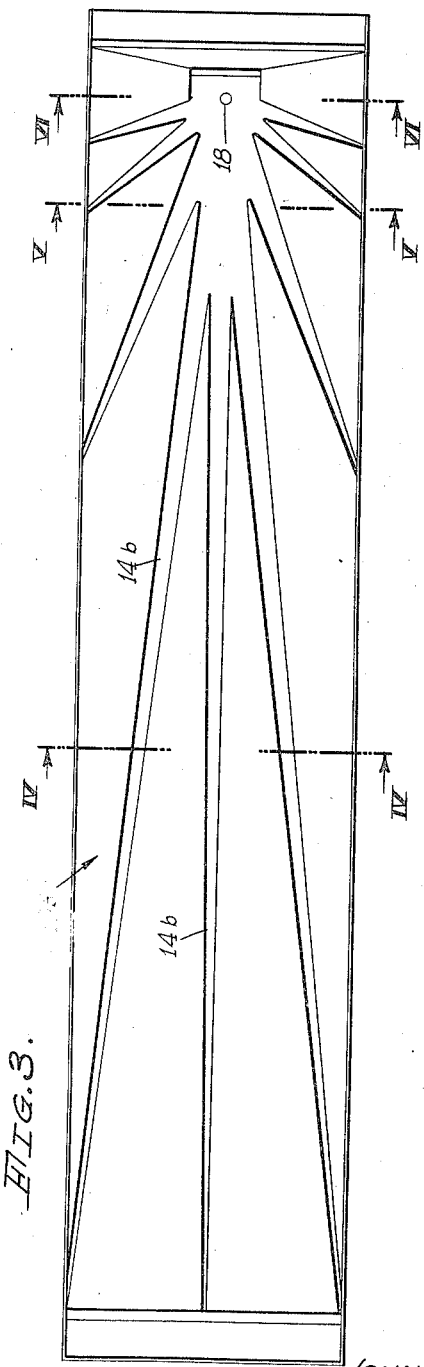
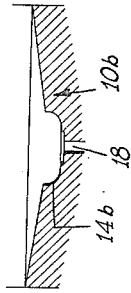
INVENTOR.
JOHN A. TRAYLOR
BY
ATTORNEY.

Patented July 16, 1940

2,208,141

UNITED STATES PATENT OFFICE 2,208,141

CONCENTRATING TABLE

John A. Traylor, Denver, Colo.; Edna T. Eisenhand, Tessie S. Traylor, and John B. Traylor, coexecutors of John A. Traylor, deceased Application August 8, 1938, Serial No. 223,662

3 Claims. (Cl. 209—437)

My invention relates to concentrating or washing machines, employed for the separation of materials or minerals of different specific gravities, one from the other, such as concentrates in ores, free gold in ores or gravels, black sands in sands and gravels, coal washing, or the gravity separation of any several materials needing to be separated, one from the other, by gravity methods, whether mixed with water or other fluids, or in a dry state.

In the mining industry one of the important processes comprises the separation of minerals, metallics, sulphides, or particles having greater specific gravity than others, either from ores that have been crushed previous to concentration or from sand and gravels, as in placer mining. The separation as heretofore done was by taking advantage of the varying specific gravities of the minerals or substances to be separated, one from the other, in a flowing stream of water or from a pool containing water or from a pool by agitation with air or other gases.

The practice heretofore used in separating of minerals from their ores or concentrating or separating one heavier mineral or metal from another, has been principally by means of causing the material to pass over a deck or table in the general direction longitudinally of the table. By means of riffles longitudinally or diagonally across the table, the heavier material to be concentrated out is caused to stay up on the table and move progressively towards the discharge end of the table by means of a side current of water or a counter-current of water flowing invariably in a direction transverse of the table. The lighter material is washed away and the heavier material is left behind the riffles, to pass off of the discharge end of the table.

The effect of this is to expose the mineral or metal or other materials to be recovered or separated, one from the other, to the continual counter-wash of a current of water, and in some cases to a current of air or gases. Small particles of mineral desired to be recovered, being continuously exposed to this counter current of water, are washed across the table with the tailings and in most cases result in heavy losses.

An object of my invention is to provide a deck or table of any desired form over which the materials to be treated and separated may flow, the heavier materials going to the bottom and remaining there until they reach any desired point, where they can be removed separately without at any time exposing them to the current of water which might result in their loss.

Another object of my invention is to provide a concentrating table or washer over which a mixture of concentrates and gangue may flow and in which the concentrates will pass to a pool from which they may be readily drawn off either periodically or continuously.

Another object of my invention is to provide a concentrating table of the character set forth in the preceding paragraph in which ready means is provided for adjusting the machine to permit it to readily separate different gravities of concentrates without requiring any reconstruction of the machine.

It is another object of my invention to provide a concentrating table which includes a deck or table across which a pulp or aqueous mixture of concentrates and gangue may flow over, the surface of the deck being arranged in such manner as to permit the ready separation of heavy materials from the pulp and the collection of such materials at one or more predetermined points along the deck from which the concentrates may be readily removed.

It is another object of my invention to provide a selective valve for concentrating or washing tables of the character set forth which may be readily adjusted to accurately select the specific gravity of the concentrates to be removed from the pulp.

Other objects and advantages of my invention will be apparent from a study of the following specifications, read in connection with the accompanying drawings, wherein:

Fig. 1 is a vertical sectional view taken through one form of concentrating table or washing table embodying the principles of my invention;

Fig. 2 is a plan view of the deck or table portion of the machine shown in Fig. 1;

Fig. 3 is a plan view of a modified arrangement of deck which may be employed in a concentrating table constructed in accordance with my invention;

Figs. 4, 5 and 6 are transverse sectional views through the deck shown in Fig. 3, the views being taken respectively along lines IV—IV, V—V and VI—VI of Fig. 3; and Fig. 7 is an enlarged detail sectional view taken through a draw off valve and control device therefor which may be employed in the practice of my invention.

Referring to the drawings I have illustrated my invention as embodied in a concentrating table particularly adapted for the separation of metal concentrates from ores or gangue in which they are found, though it will be understood by those skilled in this art that the principles of my invention are equally adapted to separation of any heavy materials from dirt or other light materials with which they may be mixed.

In Fig. 1 I have illustrated my concentrating table as comprising a suitable elongated base 1 having a plurality of bearing members 2 disposed at intervals therealong in which rest feet 2a by which the movable portion 3 of the table may be suspended so as to be freely removed or reciprocated longitudinally with respect to the stationary base 1. The movable portion 3 of the table includes a suitable framework which may comprise longitudinal bars 4 interconnected at their ends my means of transverse bars or boards 5 and 6 to form a bed upon which is supported a tank including side walls 7, end walls 8 and 9, and a floor or deck 10. The tank may be constructed of any suitable material, though I prefer to employ wood for at least the floor or deck portion of the tank. The deck 10 is preferably arranged at a slight angle to the vertical, the highest point thereof being disposed adjacent the end 8 of the tank which preferably constitutes the entrance end into which the pulp or mixture to be separated is introduced, while the lowest portion of the floor or deck 10 is preferably arranged near the end 9 which may constitute an exit or overflow end over which the excess of pulp may pass after it has passed along the length of the tank.

The transverse shape of the deck 10 may be either troughed or flat, though in the form of the device shown I have illustrated the deck or floor as having all of its portions angling downwardly toward the longitudinal center to define along such center line a distinct trough effect into which the concentrates or heavier solid particles of the material may settle and along which such particles will move toward a "pan" defined by the lowermost portion of the deck adjacent the exit end 9 thereof.

As will be understood by those skilled in this art, the movable portion of the table should be jiggled or shaken in such a manner as to cause some measure of agitation in the concentrates accumulated on the surface of the deck, such motion being preferably such as to give a progressive, stratifying motion to the table and the bed of concentrates thereon. As typical of such mechanism I have shown a vibrating mechanism at 11 secured upon an extending end of the base 1 which may include an unbalanced wheel 12 connected in any suitable manner as indicated at 13 to the frame of the movable portion of my table, such devices being usually arranged to produce a reciprocating motion of the table 3 in which the motion in one direction is more rapid than the motion in the opposite direction. Thus, any concentrates which may accumulate on the deck surface will tend to be moved both toward the central trough and toward the lowermost or exit end of the deck.

To assist in the more ready separation of the concentrates or heavier particles from the pulp I may arrange a plurality of obstructions or riffles extending as either depressions in the surface of the deck or as vertically extending obstruction members above the surface of the deck. In the form of the device shown in Figs. 1 and 2 the riffles may be constructed as a plurality of relatively narrow and shallow strips of wood or similar material 14 bolted, nailed, or otherwise secured to the deck surface, each of the strips 14 extending radially away from the center of the outlet end 9 of the table in such a manner as to guide any concentrates which may be disposed between them toward that end of the deck.

In employing my concentrating table the pulp 15 is preferably continuously fed into the entrance end 8 and will flow slowly along the table, depositing the heavier particles upon the deck surface, while the remaining portions of the pulp or gangue will overflow at the exit end 9 of the table, their being substantially at all times a body of the pulp material on the table to a depth approximately level with the upper edge 15 of the trough end 16.

As the heavier particles or concentrates separate from the gangue they will be gradually moved laterally of the table into the trough like center thereof and thence be passed to a sump or pool indicated at 17 at the lowermost portion of the deck where they may be drawn off either continuously or intermittently as desired. In order to permit the concentrates to be drawn off without appreciable agitation thereof I provide an outlet 18 communicating with the lowermost portion of the deck and provide a valve structure 19 therefor by which the outlet may be controlled and regulated in acordance with the amount of concentrates to be removed.

Referring particularly to Figures 1 and 7 it will be observed that the outlet 18 may comprise a suitable opening bored through the deck 10 into which is seated a pipe or tube 20 having one or more openings 21 formed therein at approximately the level of the upper surface of the deck 10 through which concentrates may flow into the pipe 20. An inner pipe or tube 22 is arranged to slide vertically within the outer or guide pipe 19 and is provided with one or more openings 23 alignable with the openings 21 in the outer pipe 20. The inner pipe 22 is arranged to be raised and lowered either manually or automatically from the position shown in full lines in Fig. 7 to the position shown in dotted lines in that figure to move the openings 23 from their normal position disposed away from the openings 21 to a position aligned with the openings 21, so that whenever the openings are in alignment, the concentrates which have accumulated in the sump 17 may pass into the interior of the pipes 20 and 22 and thence outwardly from the machine.

In certain types of work, such as the separation of precious metals from their ores, it may be desired to cover the table with a suitable top (not shown) and to arrange the valve 19—23 to be normally locked in its closed position so that an attendant may, from time to time, unlock the valve and draw off such accumulation of concentrates as may be present in the sump 17.

On the other hand it may be desired that the concentrates be removed continuously and in order to permit such removal, I prefer to arrange the valve 19—23 to be automatically open in accordance with the accumulation of concentrates in the sump 17. To permit this automatic operation I provide a float 24 adapted to float upon the concentrates but not to float in the gangue or other material from which the concentrates are to be separated. In the form of the device shown in Figs. 1 and 7 the float 24 may comprise an annular chamber constructed of light weight material or other suitable material adapted to surround the stationary pipe 20 and preferably provided with inwardly extending lugs 25 to engage and guide the float as it rises or falls. The float 24 is suspended from the inner pipe 22 as by means of an inverted U shaped tube, opposite ends of which are secured to and communicate with the float 24. The base of the U shaped tube 26 is rigidly secured to the tube 22 as by means of a head or plug 27 so that as the float 24 rises the tube 22 will be raised to tend to bring its openings 23 into alignment with the openings 21 in the outer tube 20. By properly selecting the material and the weight of the float 24, its supporting tube 26, and the inner valve tube 22, with regard to the specific gravity of the concentrates, it follows that as the concentrates accumulate in the sump the valve 19—23 will be automatically open and the concentrates will be passed from the machine as they accumulate therein.

In order to permit the ready alteration of the specific gravity of the float 24 I prefer to insert into or remove from the float some suitable heavy material such as mercury or metal balls which may be readily placed into or removed from the float through a plugged entrance 28 in the U shaped supporting tube. By adding or removing such weight material the valve may be readily altered to fit a particular gangue or mixture to be treated upon my table, the essential thing being that the float should be arranged to have a heavier specific gravity than the fluid mixture of the lighter materials and be less than the specific gravity of the concentrates desired to be removed so that while the float member 24 will float upon and be lifted by the concentrates it will at all times remain submerged in the gangue or light materials.

While I have illustrated in Figs. 1 and 2 a single outlet 18 and all portions of the deck 10 angling downwardly toward this outlet to define a pool in which the concentrates may accumulate, it will be apparent that a number of pools, or sumps, may be formed by merely providing additional outlets along the length of the deck and arranging the annular disposition of the surface of the deck in such a manner as to tend to move the concentrates toward such plurality of pools. Thus the capacity of my machine for the treatment of ores or other materials to be separated may be increased.

As hereinbefore stated, the particular configuration of the deck 10 may be pointed without departure from the principles of my invention as long as the deck surface is arranged to tend to move the concentrates toward the lowermost portions of the deck to define the pools into which the concentrates will accumulate. For example, in Figs. 3, 4, 5 and 6 I have illustrated a modified form of deck 10b which may have grooves or depressions 14b formed therein like the riffles 14 radiating from the outlet 18 in such a manner as to define a troughing effect, tending to move the concentrates toward the outlet or pool.

It will therefore be observed that I have provided a concentrating table of extremely simple construction which is provided with a deck adapted to assist the separation of the concentrates from the pulp by means of riffles, grooves or actual troughing of the deck and in which a simple longitudinal reciprocating motion of the table will move the concentrates so separated toward one or more accumulating pools or sumps from which such concentrates may be readily drawn, either intermittently or continuously.

While I have shown and described the preferred embodiment of my invention, I do not desire to be limited to any of the details of construction shown or described herein, except as defined in the appended claims.

I claim:

1. In an apparatus for separation of heavy solids from a liquid mixture of said solids with lighter solids, an elongated deck defining a surface over which the mixture may flow; a sump disposed at one end of said deck below said surface; and a plurality of grooves extending radially away from said sump, formed in said surface and extending into communication with said sump, for directing heavy solids settling from said mixture upon any portion of said surface toward said sump, each of said grooves having a depth and a cross sectional area which varies uniformly along the length of said groove from a maximum at a point adjacent said sump to a minimum at a point farthest away from said sump.

2. In an apparatus for separation of heavy solids from a mixture of said solids with lighter solids, an elongated deck defining a surface over which the mixture may flow; a sump disposed at one end of said deck below said surface; and riffle strips disposed upon said deck surface, a plurality of which extend substantially the full length of said deck, and all of which extend radially away from said sump for directing toward said sump solids settling upon any portion of said surface from said mixture.

3. In an apparatus for separation of heavy solids from a liquid mixture of said solids with lighter solids, an elongated deck defining a surface over which the mixture may flow; a sump disposed at one end of said deck below said surface; and means defining channels along the surface of said deck, a plurality of which extend substantially the full length of said deck, and all of which extend radially away from said sump and into communication therewith for directing solids toward said sump settling from said mixture upon any portion of said surface.

JOHN A. TRAYLOR.